(12) United States Patent
Wang

(10) Patent No.: US 6,520,278 B2
(45) Date of Patent: *Feb. 18, 2003

(54) HYDRAULIC POWER STEERING DEVICE

(75) Inventor: Chaojiu Wang, Tochigi (JP)

(73) Assignee: Showa Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/508,554

(22) PCT Filed: Jul. 12, 1999

(86) PCT No.: PCT/JP99/03753

§ 371 (c)(1),
(2), (4) Date: Mar. 10, 2000

(87) PCT Pub. No.: WO00/02761

PCT Pub. Date: Jan. 20, 2000

(65) Prior Publication Data

US 2001/0045318 A1 Nov. 29, 2001

(30) Foreign Application Priority Data

Jul. 10, 1998 (JP) .......................... 10-196166

(51) Int. Cl.⁷ ................................. B62D 5/06
(52) U.S. Cl. ....................... 180/421; 180/417; 180/441; 180/442
(58) Field of Search ................ 180/441, 442, 180/417, 421, 422, 423

(56) References Cited

U.S. PATENT DOCUMENTS

| | | | | |
|---|---|---|---|---|
| 3,901,343 A | * | 8/1975 | Inoue ........................ | 180/143 |
| 4,085,817 A | * | 4/1978 | Kervagoret ................ | 180/132 |
| 4,293,051 A | * | 10/1981 | Nishikawa ................. | 180/133 |
| 4,637,484 A | * | 1/1987 | Ijiri et al. ................. | 180/142 |
| 4,674,587 A | * | 6/1987 | Suziki et al. .............. | 180/142 |
| 4,681,184 A | * | 7/1987 | Suzuki et al. ............. | 180/141 |
| 4,718,514 A | * | 1/1988 | Hirakushi .................. | 180/142 |
| 4,766,801 A | * | 8/1988 | Hachisuka ................. | 91/371 |
| 4,803,913 A | * | 2/1989 | Hachisuka ................. | 91/371 |
| 4,840,244 A | * | 6/1989 | Broucksou ................. | 180/143 |
| 4,955,446 A | * | 9/1990 | Ooishi ...................... | 180/143 |
| 5,058,626 A | * | 10/1991 | Takaoka et al. ........ | 137/625.66 |
| 5,135,068 A | * | 8/1992 | Emori et al. .............. | 180/132 |
| 5,445,239 A | * | 8/1995 | Miller et al. .............. | 180/132 |
| 5,794,507 A | * | 8/1998 | Strong ...................... | 91/375 A |
| 6,148,947 A | * | 11/2000 | Eberhart et al. ........... | 180/441 |

FOREIGN PATENT DOCUMENTS

| | | |
|---|---|---|
| JP | 58139867 | 8/1983 |
| JP | 6067266 | 4/1985 |
| JP | 61159283 | 10/1986 |
| JP | 6243367 | 2/1987 |
| JP | 249109 | 12/1990 |
| JP | 150749 | * 6/1997 |

* cited by examiner

Primary Examiner—Brian L. Johnson
Assistant Examiner—Daniel Yeagley
(74) Attorney, Agent, or Firm—Orum & Roth

(57) ABSTRACT

A hydraulic power steering apparatus 1 which is arranged so that a damper valve 10 is disposed in hydraulic oil circuits 8 and 9 for connecting an oil passage selector valve 11 in a gear box with right and left oil chambers of a power cylinder 6. The damper valve 10 comprises a spool valve. And a control oil chamber 21 of the spool valve 10 is connected with a hydraulic oil feed passage 18 for connecting a hydraulic pump 13 which is driven by an internal combustion engine so as to discharge hydraulic oil, with the oil passage selector valve 11. Its back pressure chamber 17 is connected with a hydraulic oil circulating passage 19 for connecting the oil passage selector valve 11 with a reservoir tank 12. Orifices 27 and 28 are provided in connecting oil passages 22 and 20, such that when discharge oil pressure of the hydraulic pump 13 rises, opening of the spool valve 10 increase.

2 Claims, 5 Drawing Sheets

PRIOR ART

HYDRAULIC POWER STEERING DEVICE

This is a 371 of International application PCT/JP99/03753, with an international filing date of Jul. 12, 1999.

TECHNICAL FIELD

The present invention relates to a vehicle-use hydraulic power steering apparatus useable in a vehicle, the apparatus having a damper valve. In particular, the invention relates to a hydraulic power steering apparatus in which the dampering effect is changeable according to the number of revolutions of an internal combustion engine so that steering follow-up performance in a low speed range of the vehicle is improved and stability of steering in a high speed range is improved.

BACKGROUND ART

Conventionally, Japanese Utility Model Application Publication No. 2-49109 discloses a hydraulic power steering apparatus used in a vehicle in which a damper valve is disposed in a hydraulic oil circuit for connecting an oil passage selector valve in a gear box with right and left oil chambers of a power cylinder.

In this apparatus, as shown in FIG. 5, hydraulic oil circuits 08 and 09, which connect an oil passage selector valve 011 housed in a gear box of a hydraulic power steering apparatus 01 with right and left oil chambers of a power cylinder 06, is provided with check valves 010a, 010a which allow oil only to flow from the oil passage selector valve 011 to the right and left oil chambers, and throttle check valves 010b, 010b which have an initial load and allow oil only from the oil chambers to the oil passage selector valve 011. The check valves 010a, 010a and the throttle check valves 010b, 010b comprise a damper valve.

A hydraulic pump 013 which is a hydraulic source for supplying hydraulic oil to the power cylinder 06 includes a flow control valve 023, a relief valve 024 and a fixed orifice 025, and their cooperation allows the hydraulic oil to be discharged by a discharge amount in compliance with a characteristic chart shown in FIG. 4 according to the number of revolutions.

In other words, the hydraulic oil which gradually increases and reaches a substantially constantly high level is discharged in a low revolving range where the number of revolutions of the hydraulic pump 013 reaches a predetermined low revolving speed N, and when it exceeds the number of revolutions N, the hydraulic oil whose amount gradually decrease and reaches a substantially constantly low level is discharged. The hydraulic pump 013 is connected to a crank shaft of an internal combustion engine, not shown, via a transmission mechanism, and it rotates at the number of revolutions which is the same as the number of revolutions of the internal combustion engine.

Since the damper valve in the above-mentioned conventional hydraulic power steering apparatus 01 does not have a portion where friction is generated, returning performance of a steering handle is excellent. Moreover, since each of the throttle check valves 010b, 010b has the initial load, even if a rack shaft 04 which serves also as a piston rod of the power cylinder 06 tries to slightly oscillate due to unbalance of tires or the like, the flow of the hydraulic oil from the right and left oil chambers to the oil passage selector valve 011 is restricted, and thus the rack shaft 04 hardly moves. For this reason, slight oscillation of the steering handle, namely, a shimmy phenomenon, can be prevented. In this regard, reference numeral 012 is a reservoir tank.

However, since the conventional damper valve has a constant damper effect regardless of the number of revolutions of the internal combustion engine (the number of revolution of the hydraulic pump) and the speed of a vehicle, the damper effect is not required so much at the time of low-speed revolution of the internal combustion engine and in a low-speed operation of the vehicle. In fact the damper effect is required in the occasion opposite to the above one. However, in the past the damper effect could not be adjusted according to the degree of necessity. For this reason, there is a need to improve steering follow-up performance of the steering handle particularly, at the low speed of the vehicle.

DISCLOSURE OF THE INVENTION

The present invention is disclosed in order to solve the above problem. It therefore is an object of the present invention to provide a hydraulic power steering apparatus in which the damper effect of a damper valve is changeable according to the number of revolutions of an internal combustion engine so that steering follow-up performance of a steering handle, particularly in a low speed range of a vehicle can be improved, and stability of steering in a high speed range of the vehicle can be improved, and a shimmy phenomenon and the kick-back phenomenon can be prevented simultaneously.

The present invention relates to a hydraulic power steering apparatus which solves the above problem. The invention provides a hydraulic power steering apparatus, which is constituted so that a damper valve is disposed in hydraulic oil circuits for connecting an oil passage selector valve in a gear box with right and left oil chambers of a power cylinder, characterized in that: the damper valve is composed of a spool valve. A control oil chamber of the spool valve is connected with a hydraulic oil feed passage for connecting a hydraulic pump which is driven by an internal combustion engine so as to discharge hydraulic oil with the oil passage selector valve. Its back pressure chamber is connected with a hydraulic oil circulating passage for connecting the oil passage selector valve with a reservoir tank. Orifices are provided respectively in the connecting oil passages, and when a discharged oil pressure of the hydraulic pump rises, the opening of the spool valve increases.

Since the invention is constituted as mentioned above, the spool valve, which composes the damper valve disposed in the hydraulic oil circuits for connecting the oil passage selector valve with the right and left oil chambers of the power cylinder, is constituted so that its control oil chamber is connected with the hydraulic oil feed passage for connecting the hydraulic pump with the oil passage selector valve. Its back pressure chamber is connected with the hydraulic oil circulating passage for connecting the oil passage selector valve with the reservoir tank. When the spool valve is actuated in compliance with a discharge oil pressure of the hydraulic pump, which is driven by the internal combustion engine so as to discharge hydraulic oil and the discharge oil pressure rises, the opening of the spool valve increases.

As a result, when the number of revolutions of the internal combustion engine is low and thus the number of revolutions of the hydraulic pump is low, and a discharge amount of the hydraulic oil increases based on a characteristic chart of the power steering, when a steering handle is steered, a discharge pressure of the hydraulic oil also rises. As a result, opening of the damper valve increases, and thus the hydraulic oil circuits are opened to a greater extent. As a result, the hydraulic oil easily flows through the circuits, the damper effect of the damper valve is weakened, and steering follow-up performance of the steering handle in a low-speed range of a vehicle is improved so that an operator feels lightness of steering.

In addition, in the case where the number of revolutions of the internal combustion engine is high, and thus the number of revolutions of the hydraulic pump is high and a discharge amount of the hydraulic oil becomes small based on the characteristic chart of the power steering, even when the steering handle is steered, the discharge pressure of the hydraulic oil does not rise so much. As a result, the opening of the damper valve becomes small so that the hydraulic oil circuits are opened to a lesser extent. As a result, the hydraulic oil flows with difficultly through the circuits, and the damper effect of the damper valve is manifested. Then, the steering follow-up performance of the steering handle in a high-speed range of the vehicle is lowered, and instability of the steering wheel in a neutral position is reduced, so that the operator feels stability of the steering.

Further, in this case, since the damper valve displays the essential damper effect, slight oscillation (shimmy phenomenon), which is transmitted from the wheels to the steering handle via a piston rod (rack shaft) of the power cylinder while the vehicle is running, is suppressed. Moreover, a so-called kick-back phenomenon such that the steering handle rotates in a reverse manner, which occurs when the wheels run onto a rock or the like, is also suppressed. As a result, comfortableness of the steering is improved.

In addition, since orifices are disposed respectively in a connecting oil passage for connecting the control oil chamber of the damper valve (spool valve) with the hydraulic oil feed passage and in a connecting oil passage for connecting the back pressure chamber with the hydraulic oil circulating passage, the movement of a spool of the damper valve is slowed down. As a result, when the steering handle is returned to its neutral position, particularly in a low-speed range of a vehicle, the steering handle can be returned before the damper effect is generated so that the operator feels the steering being more light.

BEST MODE FOR CARRYING OUT THE INVENTION

There will be described below one embodiment of the present invention shown in FIGS. 1 through 4.

Figure 1:
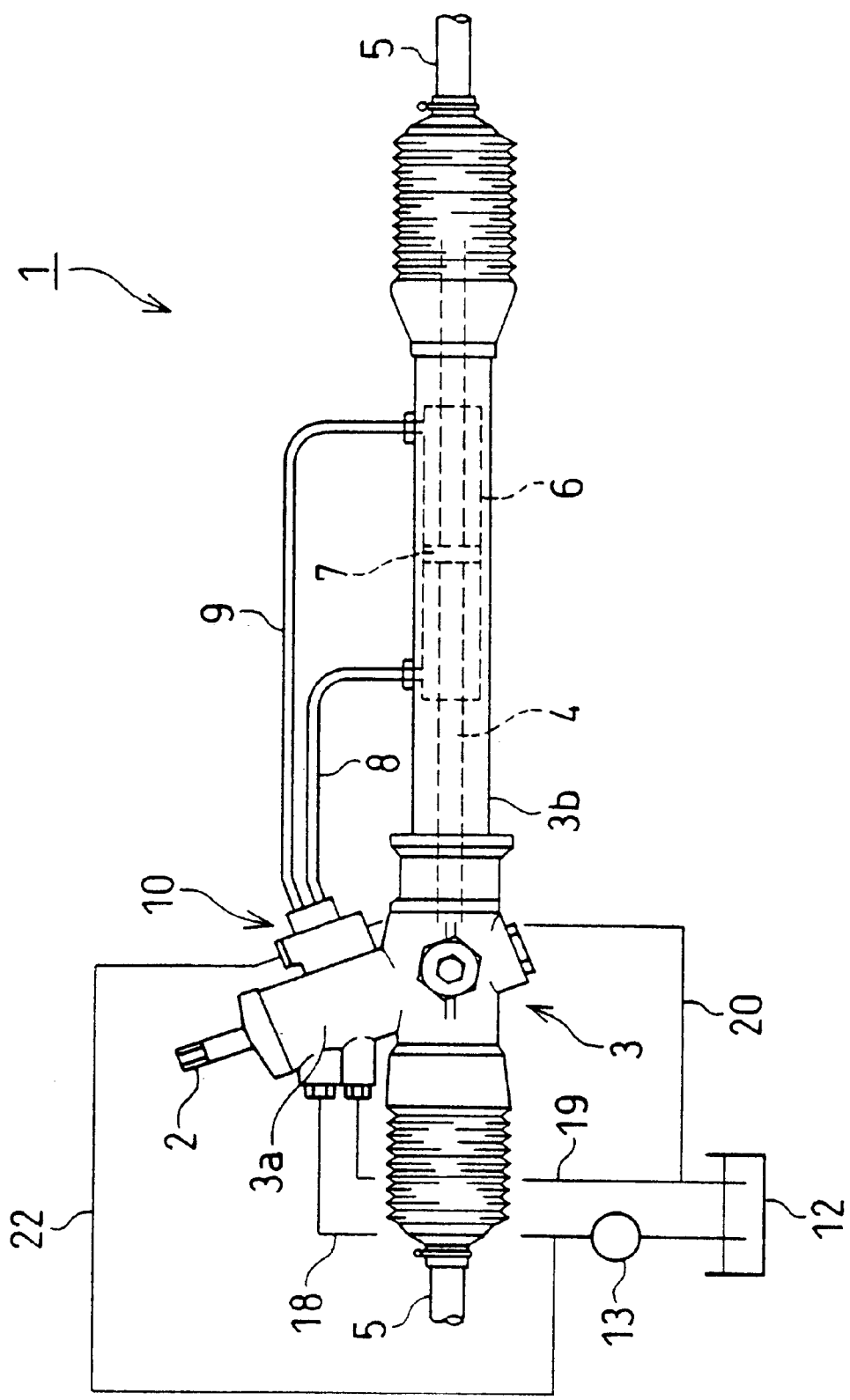
FIG. 1 is a whole structural diagram of a hydraulic power steering apparatus according to one embodiment of the present invention.
Figure 2:
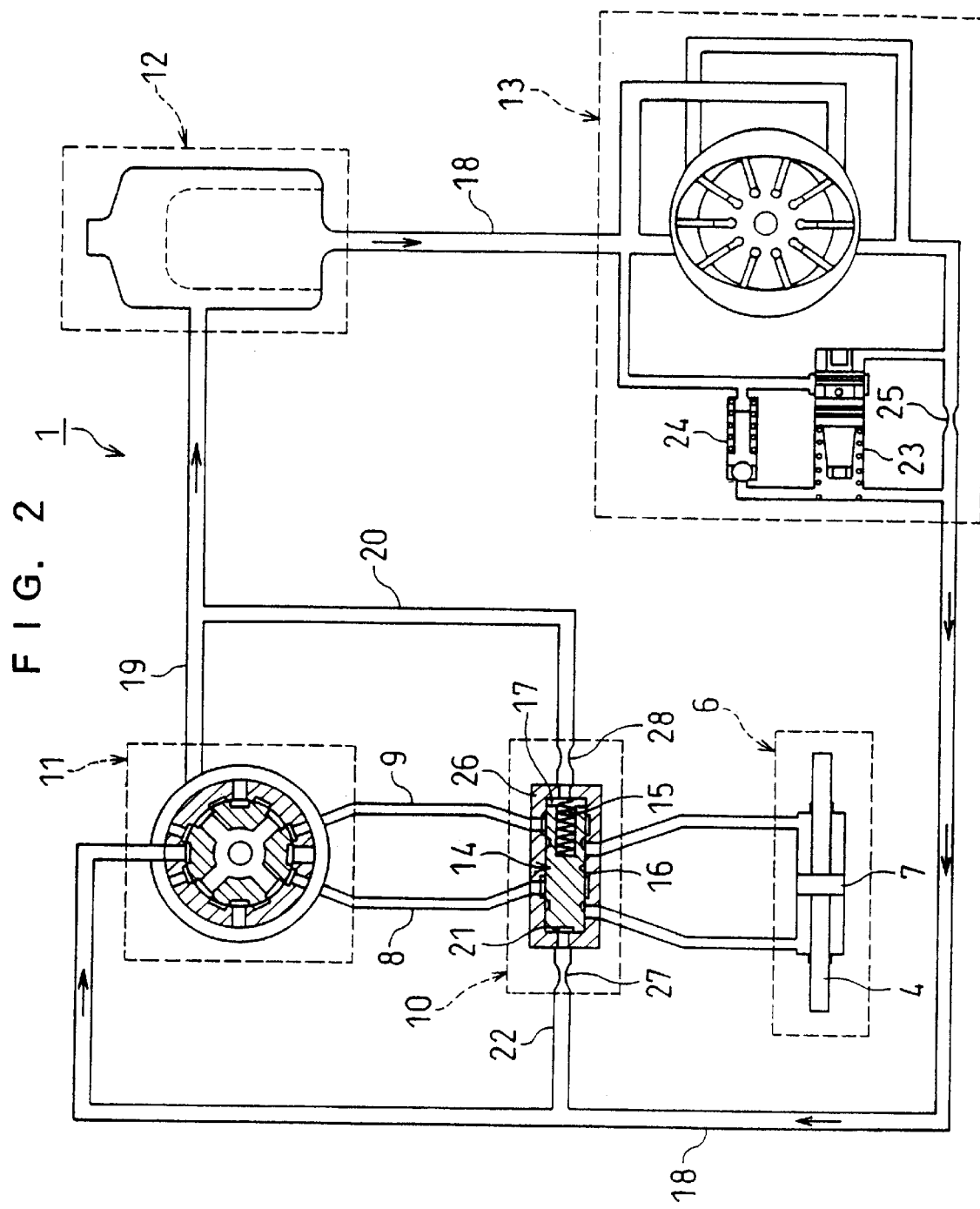
FIG. 2 is a schematic structural diagram, with portions broken away, showing the hydraulic power steering apparatus of FIG. 1.
Figure 3:
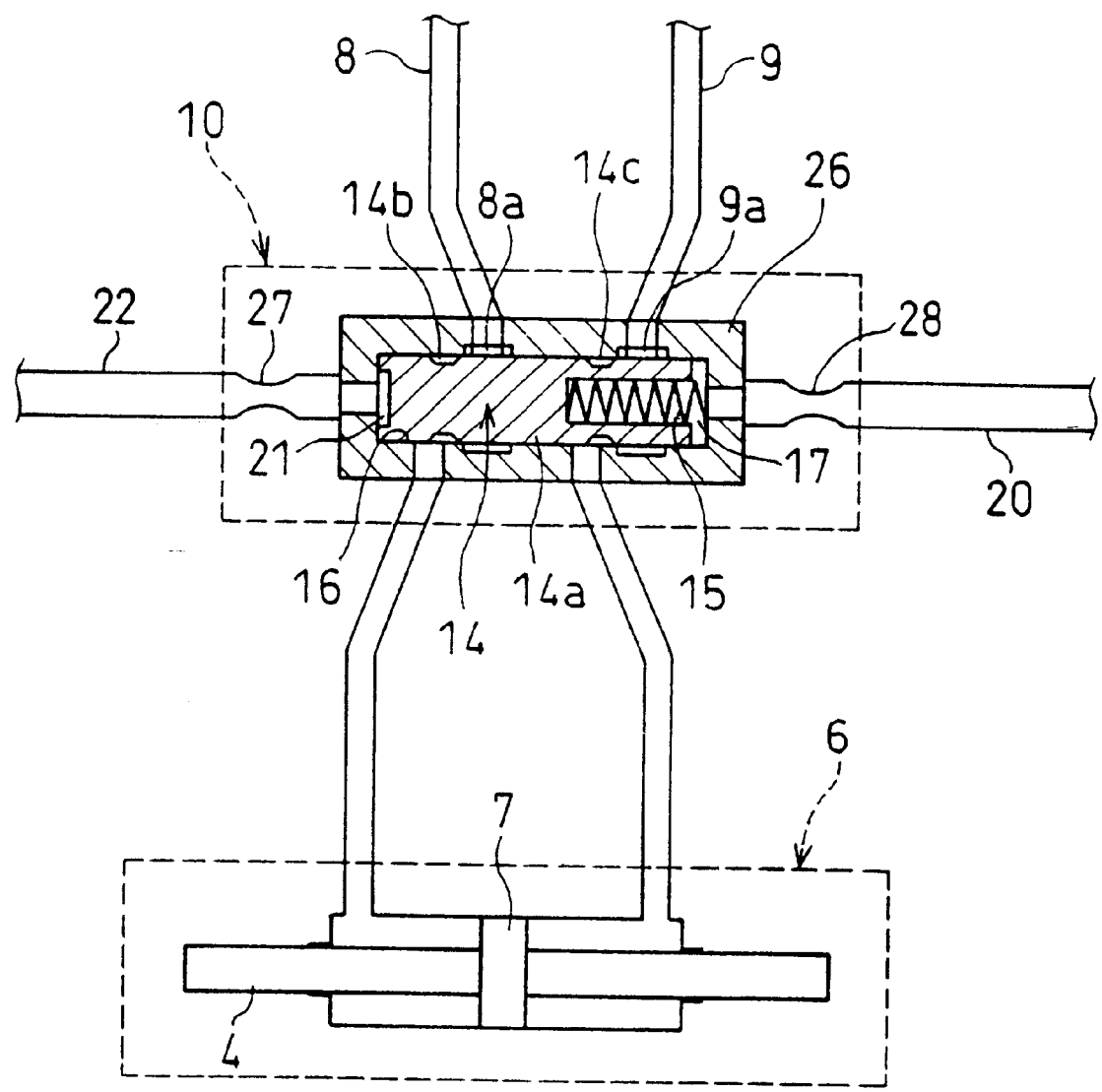
FIG. 3 is a partially enlarged diagram of FIG. 2.
Figure 4:
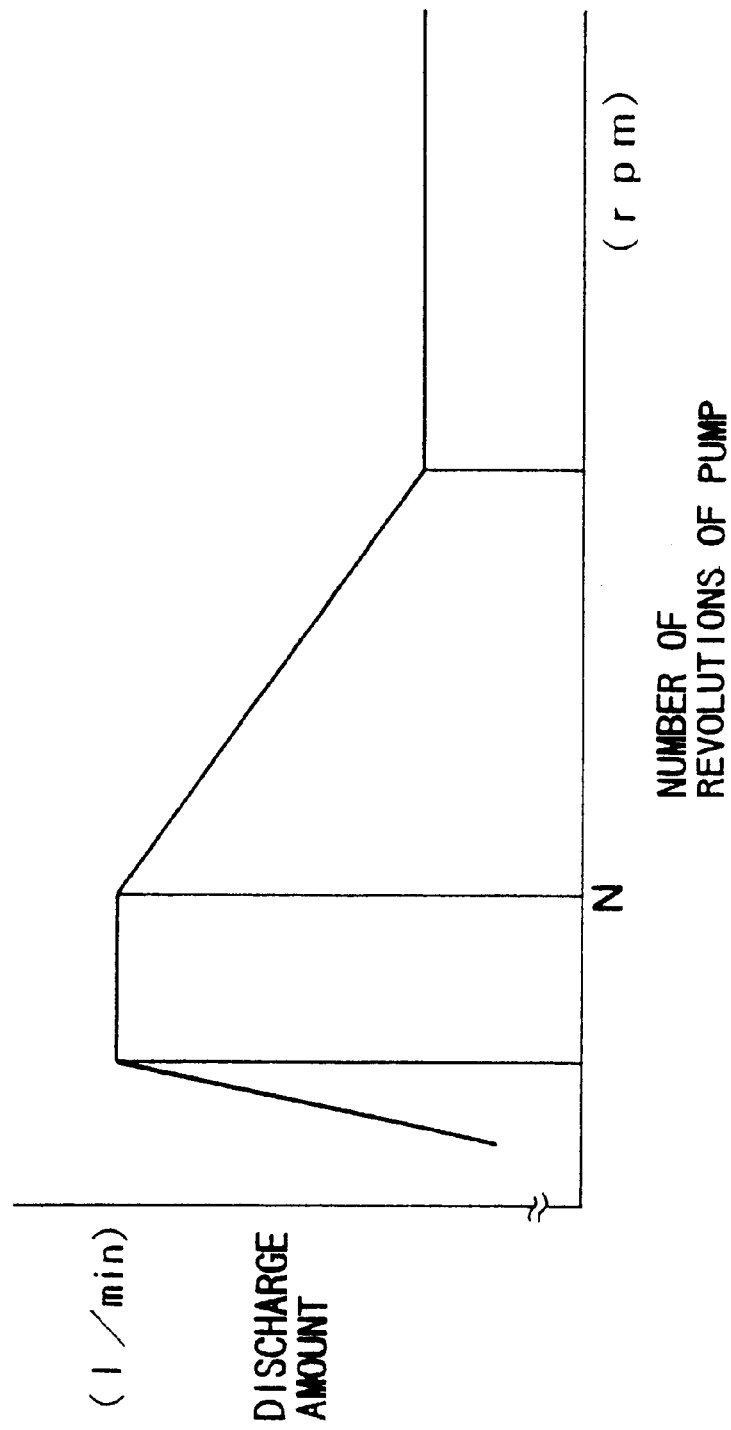
FIG. 4 is a characteristic chart of a hydraulic pump in the hydraulic power steering apparatus of FIG. 1.
Figure 5:
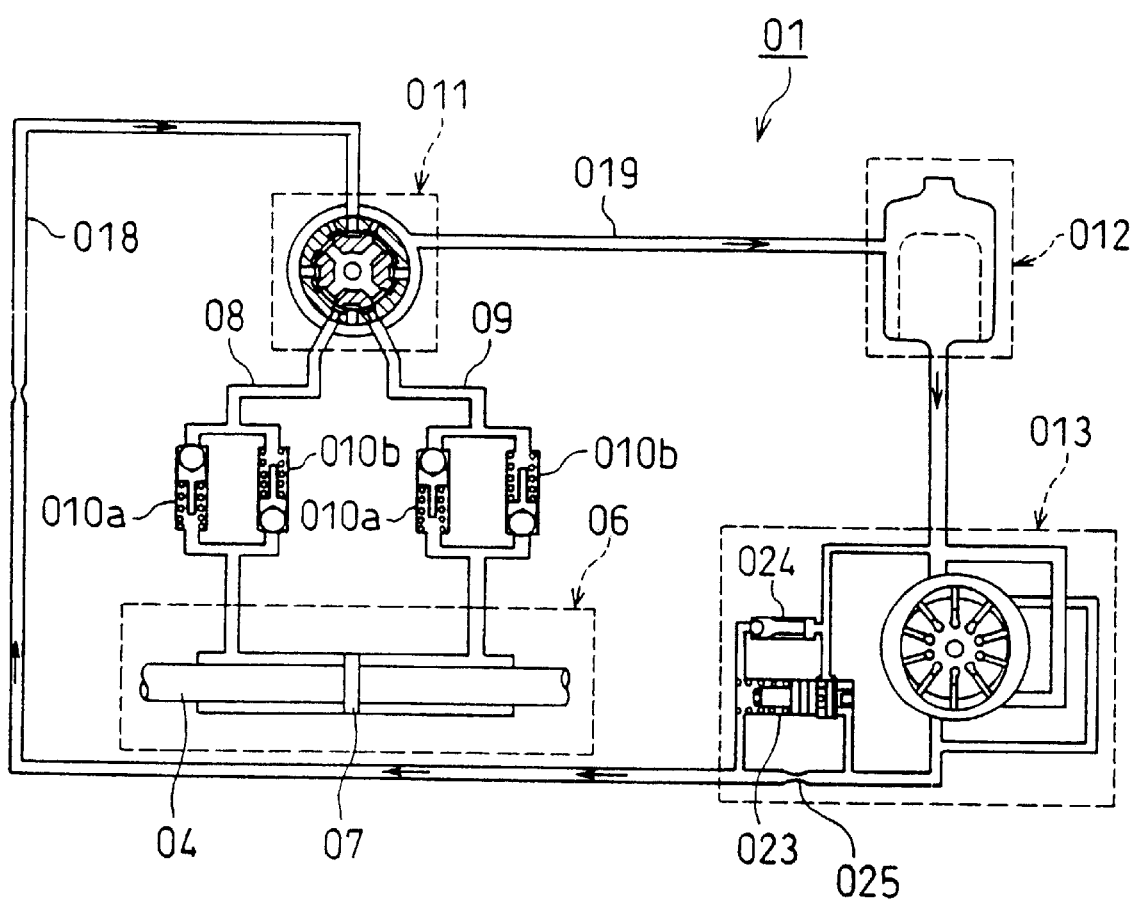
FIG. 5 is a diagram showing a conventional example.

FIG. 1 is a whole structural diagram of a hydraulic power steering apparatus according to the present embodiment, FIG. 2 is a schematic structural diagram, with parts broken away, of the hydraulic power steering apparatus of FIG. 1, FIG. 3 is a partially enlarged diagram of FIG. 2, and FIG. 4 is a characteristic chart of a hydraulic pump in the hydraulic power steering apparatus of FIG. 1.

In FIG. 1, the hydraulic power steering apparatus 1 according to the present embodiment is a rack and pinion type power steering apparatus. In this apparatus, an input shaft 2 which is connected with a steering handle of a vehicle, not shown, is connected with an output shaft (pinion shaft), not shown, via a torsion bar in a selector valve housing portion 3a of a gear box 3. And a rack shaft 4 having a rack engaged with a pinion formed on the output shaft is housed in a rack shaft power cylinder housing portion 3b of the gear box 3. so as to slide right and left as shown in FIG. 1.

Both ends of the rack shaft 4 are connected respectively with a pair of right and left tie rods 5, 5. A middle portion of the rack shaft 4 is connected with a piston 7 of a power cylinder 6 housed in the rack shaft power cylinder housing portion 3b. Therefore, the rack shaft 4 serves also as a piston rod of the piston 7.

An oil passage selector valve 11 (rotary valve: see FIG. 2) is housed in the selector valve housing portion 3a of the gear box 3. The oil passage selector valve 11 is opened in compliance with a torsion amount of the torsion bar, namely, a relative difference in a rotating amount between the input shaft 2 and the output shaft. This feeds hydraulic oil, which is pressure-fed from the hydraulic pump 13 as a hydraulic oil pressure source via a hydraulic oil feed passage 18, to one of the right and left oil chambers of the power cylinder 6 via a left cylinder oil passage 8 or a right cylinder oil passage 9, and circulates the hydraulic oil, which is returned from the other one of the right and left oil chambers of the power cylinder 6 via the right cylinder oil passage 9 or the left cylinder oil passage 8, to a reservoir tank 12 via a hydraulic oil circulating passage 19.

The hydraulic pump 13 is connected with a crank shaft, not shown, of an internal combustion engine via a transmission mechanism, and it rotates at the number of revolutions equal to the number of revolution of the internal combustion engine. As schematically shown in FIG. 2, the hydraulic pump 13 has a flow control valve 23, a relief valve 24, and a fixed orifice 25. Their cooperation discharges the hydraulic oil of a discharge amount in compliance with the characteristic chart shown in FIG. 4 according to the number of revolutions. The characteristic chart is the same as a characteristic chart of the conventional hydraulic pump 013.

Therefore, when the pinion of the output shaft is engaged with the rack, and the rack shaft 4 moves right and left, the tie rods 5, 5 integrally move right and left in compliance with the right and left movement of the rack shaft 4 so that right and left wheels are steered. The hydraulic oil, which is discharged from the hydraulic pump 13 in compliance with the number of revolutions of the internal combustion engine, and is selectively controlled by the oil passage selector valve 11, is fed to one of the right and left oil chambers of the power cylinder 6. As a result, the piston 7, the rack shaft 4 and the tie rods 5, 5 integrally move right and left so that superposable steering of the right and left wheels are executed based on steering auxiliary power.

Here, as shown in FIG. 1, a damper valve 10 is mounted to a casing of the selector valve housing portion 3a of the gear box 3.

As detailed in FIGS. 2 and 3, the damper valve 10 comprises a spool valve, which is disposed across the right and left cylinder oil passages (hydraulic oil circuits) 8 and 9 which connect the oil passage selector valve 11 with the right and left oil chambers of the power cylinder 6. The damper valve 10 can open and/or close these oil passages simultaneously so as to be capable of adjusting the damping effect.

Therefore, when the connecting oil passages 8 and 9 from the damper valve 10 to the power cylinder 6 are throttled so that the damping effect is enhanced, even when oscillation is transmitted from the wheels to the power cylinder 6 while the vehicle is running, the right and left movements of the piston 7 and the rack shaft 4 are suppressed. For this reason, the transmission of the oscillation to a steering handle, not shown, via the rack shaft 4 can be suppressed. As a result, occurrence of the shimmy phenomenon, such that the steering handle slightly oscillates, can be prevented.

In addition, occurrence of the so-called kick-back phenomenon, such that the steering handle rotates in reverse manner when the wheels run onto a rock or the like, can be also prevented for a similar reason. As a result, steering comfort is improved.

The above-mentioned damper effect of the damper cylinder 10 is changeable in compliance with the number of revolutions of the internal combustion engine as will be mentioned later.

There will be described below a detailed structure and function of the damper valve 10 and effects of the present embodiment.

As shown in FIG. 3 in detail, the damper valve 10 is housed in a spool housing hole 16 of a valve casing (sleeve) 26 such that a force is applied to a spool 14 in one direction (left direction in FIG. 3) by a spring 15, and circular U-shaped grooves 14b and 14c are formed in both sides of a land portion 14a at a center of the spool 14.

The connecting right and left cylinder oil passages 8 and 9 from the damper valve 10 to the power cylinder 6 contact with separate port portions 8a and 9a which are opened to the spool housing hole 16, and the circular U-shaped grooves 14b and 14c adjust the opening of the connecting right and left cylinder oil passages 8 and 9 according to a degree of superposing of the connecting oil passages 8 and 9 with the port portions 8a and 9a.

A control oil chamber 21, to which hydraulic oil pressure for moving the spool 14 of the damper valve 10 is applied, is formed on a left end of the spool housing hole 16 in FIG. 3. The control oil chamber 21 is connected with a discharge side of the hydraulic pump 13 via an oil passage 22 and the feed passage 18. A back pressure chamber 17 on a right end of the spool housing hole 16 in which a spring 15 is housed is connected with the reservoir tank 12 via an oil passage 20 and the circulating passage 19. Fixed orifices 27 and 28 are disposed respectively in midway portions of the oil passages 22 and 20 close to the valve casing 26.

Therefore, when the number of revolutions of the internal combustion engine is low, and the number of revolutions of the hydraulic pump 13 is also lower than the characteristic chart N of FIG. 4, and a discharge amount of the hydraulic oil is comparatively large, when the steering handle is steered, a throttling action occurs at the oil passage selector valve 11 causing discharge pressure of the hydraulic oil to rise. As a result, high pressure of the hydraulic oil is applied to the control oil chamber 21 of the damper valve 10, moving the spool 14 right in FIG. 2 against the force of the spring 15.

As a result, since the circular U-shaped grooves 14b and 14c of the spool 14 move in a direction where the connecting right and left cylinder oil passages 8 and 9 are superposed on the port portions 8a and 9a by a greater amount, the connecting right and left cylinder oil passages 8 and 9 are opened more (opening of the damper valve 10 is relatively large. Thus, the hydraulic oil easily flows through the oil passages and the damper effect of the damper valve 10 is weakened.

When the damper effect of the damper valve 10 is weakened in such a manner, the right and left movement of the rack shaft 4 becomes smooth, and thus the steering of the steering handle becomes light. As a result, the steering is more easily executed so that the steering follow-up performance is improved. Furthermore, since follow-up performance of the return of the steering handle is also improved, an operator feels the steering being light. In such a manner, normal power assist is executed.

Moreover, when the steering handle is returned, the movement of the spool 14 of the damper valve 10 is slowed down by the actions of the orifices 27 and 28. As a result, before the damper valve 10 starts to display the damper effect, the steering handle can be quickly returned to its neutral position, and thus the operator feels the steering being lighter.

In this case, the slight oscillation, which is transmitted from the wheels, not shown, to the power cylinder 6 while the vehicle is running, is slightly transmitted to the steering handle via the right and left movement of the rack shaft 4, and thus the shimmy phenomenon occurs. However, since the internal combustion engine rotates at a low speed, there arises no problem.

Next, in the case where the number of revolutions of the internal combustion engine is high and the number of revolutions of the hydraulic pump 13 is also higher than the characteristic chart N of FIG. 4, and a discharge amount of the hydraulic oil is comparatively small, even if the steering handle is steered and the throttling action is taken at the oil passage selector valve 11, the discharge pressure of the hydraulic oil does not rise so much. As a result, a low pressure of the hydraulic oil is applied to the control oil chamber 21 of the damper valve 10, and the spool 14 is moved left in FIG. 2 by the force of the spring 15.

Then, since the circular U-shaped grooves 14b and 14c of the spool 14 move in a direction where the connecting right and left cylinder oil passages 8 and 9 separate from the port portions 8a and 9a, the connecting right and left cylinder oil passages 8 and 9 are throttled (opening of the damper valve 10 is relatively small), and thus the hydraulic oil flows at a relatively low rate through these oil passages so that the damper effect of the damper valve 10 is enhanced.

When the damper effect of the damper valve 10 is enhanced in such a manner, the rack shaft 4 is not moved smoothly right and left. As a result, the steering of the steering handle becomes heavy, and the steering is hardly executed so that the steering follow-up performance is lowered. As a result, instability of the steering handle in the neutral position at a high speed of the vehicle is reduced so that the operator feels the steering being stable.

In this case, since the damper valve 10 displays the essential damper effect, generation of the slight oscillation (shimmy phenomenon), which is transmitted from the wheels, not shown, to the steering handle via the rack shaft 4 while the vehicle is running, is suppressed. Moreover, the kick-back phenomenon such that the steering handle rotates in a reverse manner, which occurs when the wheels run onto a rock or the like, is also suppressed for similar reasons. As a result, steering comfort is improved.

In the present embodiment, the damper valve 10 is mounted to the casing of the selector valve housing portion 3a of the gear box 3, but the present invention is not limited to this, and thus it may be mounted to any place possible from a layout viewpoint which is in the hydraulic oil circuits 8 and 9 for connecting the oil passage selector valve 11 in the selector valve housing portion 3a with the right and left oil chambers of the power cylinder 6.

INDUSTRIAL APPLICABILITY

According to the present invention, in the hydraulic power steering apparatus having the damper valve, the damper effect is changeable in compliance with the number of revolutions of the internal combustion engine so that the steering follow-up performance in a low-speed range of the vehicle is improved and the stability of the steering in a high-speed range is improved, and the occurrence of the shimmy phenomenon and the kick-back phenomenon can be prevented.

What is claimed is:

1. A hydraulic power steering apparatus comprising:

a hydraulic pump, a reservoir tank, an oil passage selector valve, which selects between a right and or a left hydraulic flow path a power cylinder having right and left oil chambers, and a damper valve composed of a spool valve having a single spool valve body, a control oil chamber, a back pressure chamber with a bias spring, and right and left oil passages;

said reservoir tank hydraulically interconnected between said oil passage selector valve, said spool valve back pressure chamber and an inlet of said hydraulic pump;

said hydraulic pump having an outlet hydraulically interconnected with said damper valve control oil chamber and said oil passage selector valve;

said damper valve right and left oil passages hydraulically interconnected between said oil passage selector valve right and left hydraulic flow paths and said power cylinder right and left oil chambers by left and right connecting oil passages;

said spool valve operates upon said connecting right and left oil passages, opening or closing said connecting right and left oil passages at the same time;

whereby when a discharge oil pressure of said hydraulic pump decreases, a pressure in said control oil chamber decreases allowing said bias spring to move said spool valve to a position restricting said connecting right and left oil passages.

2. A hydraulic power steering apparatus comprising:

a hydraulic pump which is driven by an internal combustion engine, a reservoir tank, an oil passage selector valve in a gear box, which selects between a right and or a left hydraulic flow path, a power cylinder with right and left oil chambers, and a damper valve composed of a single spool valve having a body, a control oil chamber, a back pressure chamber with a bias spring, a right oil passage and a left oil passage;

said reservoir tank hydraulically interconnected between an outlet of said oil passage selector valve, said spool valve back pressure chamber and an inlet of said hydraulic pump;

said hydraulic pump having an outlet hydraulically interconnected with said damper valve control oil chamber and an inlet of said oil passage selector valve;

said damper valve right and left oil passages hydraulically interconnected between said oil passage selector valve right and left hydraulic flow paths and said power cylinder right and left oil chambers by left and right connecting oil passages;

said spool valve operates upon said connecting right and left oil passages, opening or closing said connecting right and left oil passages at the same time;

whereby when a discharge oil pressure of said hydraulic pump decreases due to an increase in a revolution rate of said internal combustion engine, a pressure in said control oil chamber decreases allowing said bias spring to move said spool valve body to a position restricting said connecting right and left oil passages thereby increasing a damper effect upon said power cylinder.

* * * * *